United States Patent [19]

Wyness

[11] Patent Number: 4,765,891
[45] Date of Patent: Aug. 23, 1988

[54] HELICAL FLOW EFFLUENT WEIR

[76] Inventor: David K. Wyness, 1624 Willemoore, Springfield, Ill. 60627

[21] Appl. No.: 939,862

[22] Filed: Dec. 9, 1986

[51] Int. Cl.[4] .............................................. B01D 21/08
[52] U.S. Cl. .................................. 210/207; 210/220; 210/522; 210/525; 210/540
[58] Field of Search ........................ 210/716, 787–789, 210/800, 801, 207–209, 220, 512.1, 512.3, 521, 522, 523, 525, 532.1, 537, 538, 540

[56] References Cited

U.S. PATENT DOCUMENTS 4,146,471  3/1979  Wyness ................................ 210/715

FOREIGN PATENT DOCUMENTS 1642863 11/1971  Fed. Rep. of Germany ...... 210/801
1296854 12/1962  France ................................ 210/801

Primary Examiner—Frank Sever
Attorney, Agent, or Firm—Marshall, O'Toole, Gerstein, Murray & Bicknell

[57] ABSTRACT

Apparatus for purifying a liquid containing suspended solids comprising a walled vessel which is closed at the bottom and side and has an upper circular horizontal portion thereby defining a chamber; a conduit for feeding a liquid containing suspended solids to the chamber so that the liquid flows in a helical path upwardly in the chamber to the vessel upper portion; a liquid effluent clarifying and withdrawing device, at the upper portion of the vessel, into which liquid flowing at and adjacent the liquid surface in one direction of a circular path can substantially change direction whereby flow of the suspended solids in the circular path is maintained to a substantially greater extent than the amount of solids carried along with the liquid which changes direction thereby providing a stream of clarified liquid at the withdrawing device; and an outlet into which the stream of clarified liquid can flow from the withdrawing device and be removed from the vessel.

14 Claims, 6 Drawing Sheets

HELICAL FLOW EFFLUENT WEIR

This invention relates to apparatus and methods of treating liquids to remove solids therefrom, such as water to clarify it for potable or industrial use.

BACKGROUND OF THE INVENTION

Many liquids contain suspended solids which must be removed before the liquid can be used for industrial and domestic purposes. Thus, water from rivers and lakes contains dissolved solids which must be precipitated and then removed before the water can be used. Water from such sources, and of other origins, often contains suspended solids which need to be separated out before the water can be used for municipal purposes. Water, however, is not the only liquid which must be treated to remove solids. Various petroleum-based liquids also require treatment to eliminate solids.

Wyness U.S. Pat. No. 4,146,471 discloses apparatus and methods of treating water containing solids to produce purified or clarified water. According to the patent disclosure, water containing suspended solids is caused to flow in an upward helical path in a suitable vessel. The solids are thereby induced to migrate or move radially inwardly thus forming a concentrated blanket of solids which is removed through a central downcomer. The water collects above the blanket, which functions as a filtering media. The water above the blanket then flows over a peripheral weir and travels to a conduit for delivery to a predetermined destination.

Although the system of the Wyness patent, supra, supplies a purified water, it still contains some suspended solids which could be beneficially removed if a suitable method and apparatus were available. What is accordingly needed is a system for lowering or reducing the suspended solids content in a helical or circular flowing stream of water just prior to its removal from the top of a water body in a vessel, such as when the water is discharged to an outlet or flows over a weir.

SUMMARY OF THE INVENTION

Apparatus for purifying a liquid containing suspended solids is provided comprising a walled vessel which is closed at the bottom and side and has an upper circular horizontal portion thereby defining a chamber; a conduit means for feeding a liquid containing suspended solids to the chamber so that the liquid flows in a helical path upwardly in the chamber to the vessel upper portion; liquid effluent clarifying and withdrawing means, at the upper portion of the vessel, into which liquid flowing at and adjacent the liquid surface in one direction of a circular path can substantially change direction whereby flow of the suspended solids in the circular path is maintained to a substantially greater extent than the amount of solids carried along with the liquid which changes direction thereby providing a stream of clarified liquid at the withdrawing means; and an outlet means into which the stream of clarified liquid can flow from the withdrawing means and be removed from the vessel.

The liquid effluent clarifying and withdrawing means can comprise a baffle having an upstream end along the inner surface of the wall and a downstream end inwardly from the wall. The baffle together with the adjacent vessel wall portion can define a clarified liquid receiving and withdrawing space and the outlet means can communicate with the liquid receiving and withdrawing space.

The baffle can include a liquid flow directing plate having a lower edge adjoining the vessel wall and sloped or pitched downwardly and with the plate projecting upwardly and sloped inwardly of the vessel wall.

The liquid flow directing plate can be substantially triangular with two long approximately equal length side edges terminating in an upstream apex along the tank wall and with a short side edge located downstream and sloped inwardly from the tank wall. One of the triangular plate side edges can be a top edge and a substantially horizontal plate can extend from the liquid flow directing plate top edge to the tank wall.

One or a plurality of liquid effluent clarifying and withdrawing means can be provided at the upper portion or end of the vessel. Each liquid effluent clarifying and withdrawing means can have its own outlet means.

In a second embodiment the apparatus can have a substantially vertical circular weir wall spaced radially inwardly from the vessel wall and positioned near the chamber upper portion; a horizontal ring plate extending from the vessel wall to the bottom portion of the weir wall; the weir wall, ring plate and vessel wall can define a circular channel open at the top; and the liquid effluent clarifying and withdrawing means can comprise a baffle having an upstream end along the inner surface of the weir wall and a downstream end directed inwardly from the wall.

The outlet means into which the stream of clarified liquid can flow from the withdrawing means can include an opening in the weir wall radially outward of the baffle so that the clarified liquid can flow into the channel, with means provided to remove the clarified liquid from the channel and conduct it outside the vessel.

The baffle can have a downwardly sloped or pitched lower edge adjoining the weir wall and the plate can project upwardly and be sloped inwardly from the weir wall. The baffle can be substantially triangular and have two long approximately equal length side edges terminating in an upstream apex along the weir wall and a short side edge located downstream and sloped inwardly from the weir wall. One of the baffle side edges can be integral with the weir wall, the other side edge can be substantially horizontal and the short side edge can be located downstream and sloped inwardly from the tank wall.

The weir wall can have a triangular outlet, opening radially outward of the baffle, and the triangular outlet and baffle can be about the same size and shape.

DETAILED DESCRIPTION OF THE DRAWINGS

To the extent it is reasonable and practical the same or similar elements which appear in the various views of the drawings will be identified by the same numbers.

Figure 1:
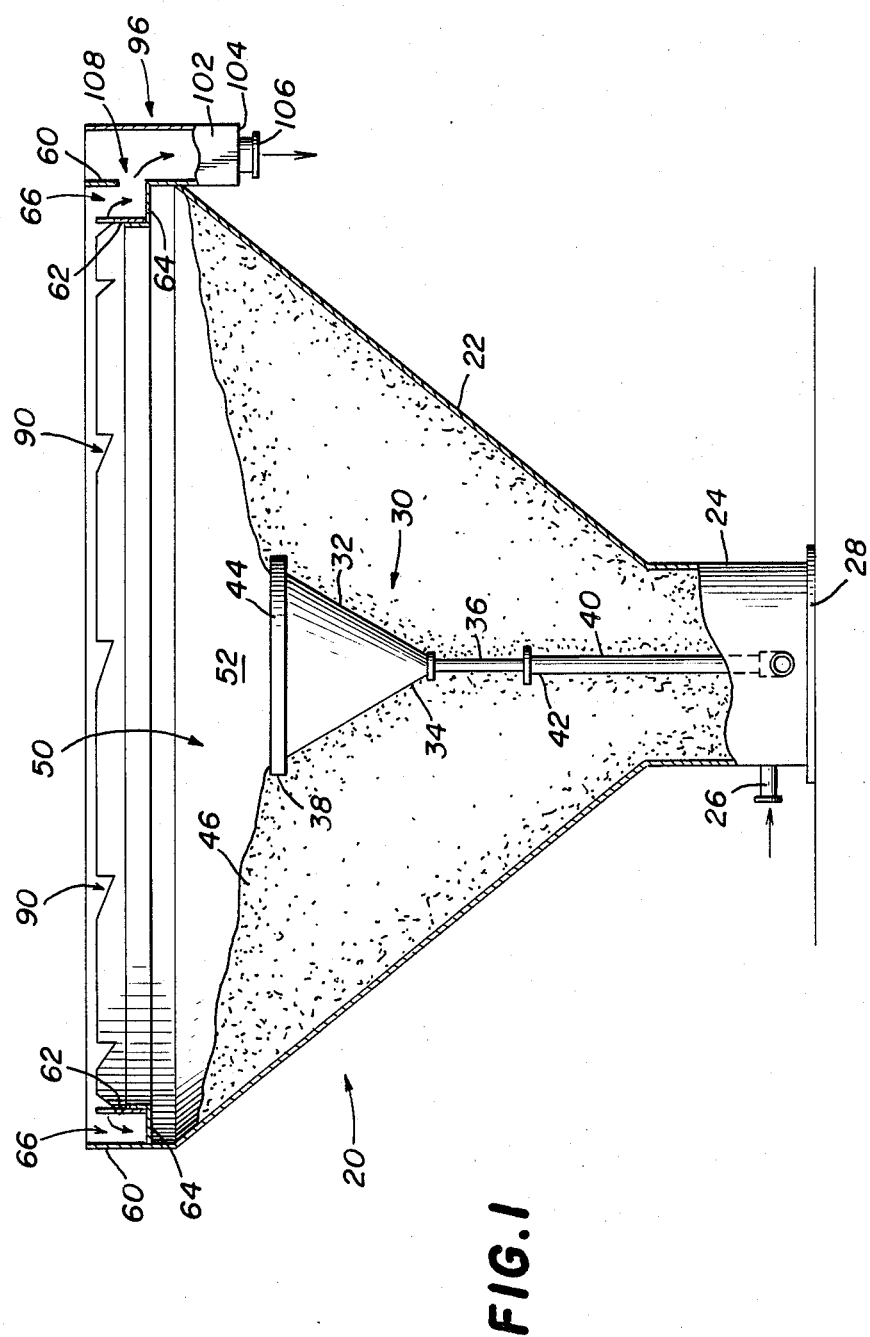
FIG. 1 is a vertical sectional view of a vessel provided with liquid clarifying baffles according to the invention.

With reference to FIG. 1, vessel 20 is shown having walls 22 in the form of a frustum of a cone with the minimum diameter located at the bottom and with the maximum diameter located at or near the upper portion or top. Attached to the lower extremity of the cone is a cylindrical inlet chamber 24 having tangential inlet 26 for water containing dissolved or suspended solids. One or more additional inlets, not shown, can be provided for introducing water-treating chemicals, such as precipitating or flocculating agents. The cylindrical chamber 24 is joined at its lower edge to bottom 28.

Vessel 20 has a vertically and axially positioned downcomer 30. The downcomer 30 has an upper conical portion 32 which is joined at its lower end 34 of minimum diameter to a vertically positioned and axially located pipe or conduit 36. A substantially vertical circular flange 38 may be joined at its upper end to the upper end of conical portion 32. This flange serves as an air trap and it can also minimize floc carry-over into the clarified liquid zone.

Pipe 40 constitutes part of downcomer 30. It has an upper end 42 into which the lower end of pipe 36 telescopes. The pipe 40 extends downwardly into chamber 24, then curved horizontally and out through the wall of the chamber for disposing of sludge. The conical portion 32 of the downcomer can be raised by means not shown to thereby locate downcomer mouth 44 at a position most suitable for sludge from rotating blanket 46 to flow into it.

The water containing suspended solids rises in a generally helical path out of cylindrical inlet chamber 24 into the conical section of the vessel. As the water rises through the conical portion 22 of the vessel, the cross-sectional area of the vessel increases, resulting in a corresponding decrease in the space flow rate of the treated water through the vessel, although the net flow rate remains constant. As the space flow rate decreases, the vertical velocity of the water decreases until the solids are no longer carried by the drag or lift and turbulence of the water, and a point of equilibrium is reached where the lifting force of the water and the counteracting gravitational force on the solids is in equilibrium, causing a suspended rotating sludge blanket 46 of the solids to form in the vessel. The rotating sludge blanket is suspended at or below the maximum diameter of the vessel.

The water, of course, continues to flow vertically through the rotating sludge blanket, leaving most of the suspended solids behind in the rotating sludge layer, but forming a layer of water 50 above blanket 46. The water layer 50 contains some suspended particles and additional particles or flocs can form by reaction with treatment chemicals in the water. These solids ultimately move into the quiescent zone 52 and are removed through mouth 44 of the downcomer. However, it is important to avoid removing suspended solids with clarified water withdrawn from water layer 50. This invention provides novel structure at the upper part of vessel 20 which facilitates further water clarification and removal of the clarified water while maintaining solids in the vessel for removal through the downcomer.

Figure 2:
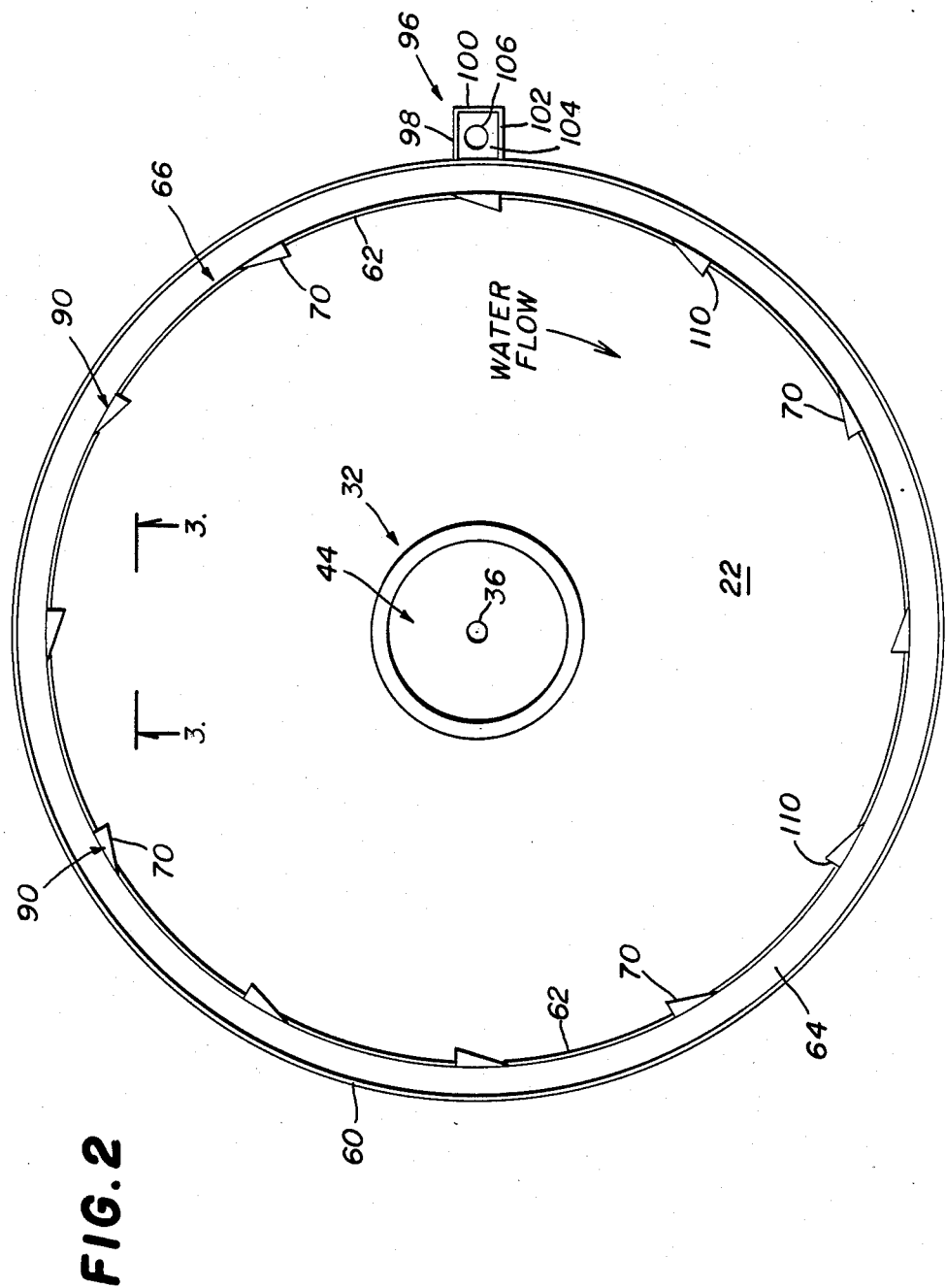
FIG. 2 is a plan view of the vessel shown in FIG. 1.
Figure 3:
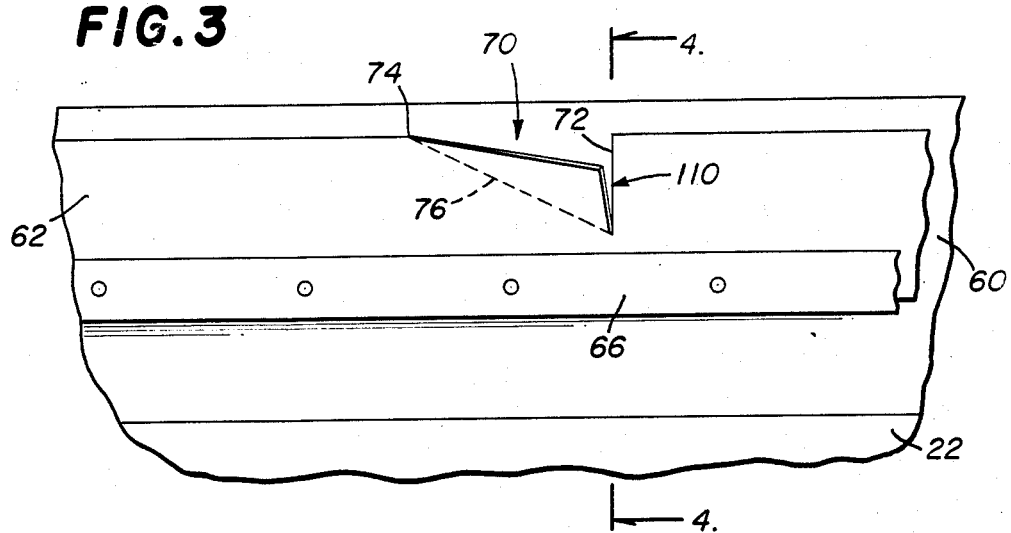
FIG. 3 is a view taken along the line 3—3 of FIG. 2.
Figure 4:
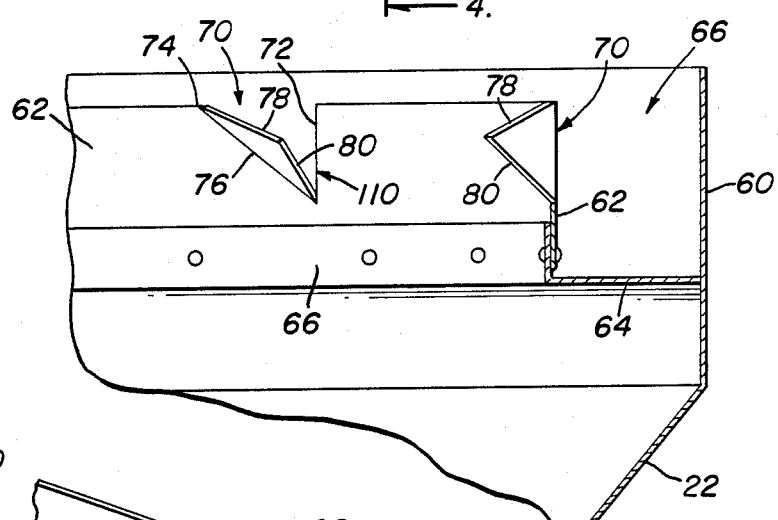
FIG. 4 is a sectional view taken along the line 4—4 of FIG. 3.
Figure 5:
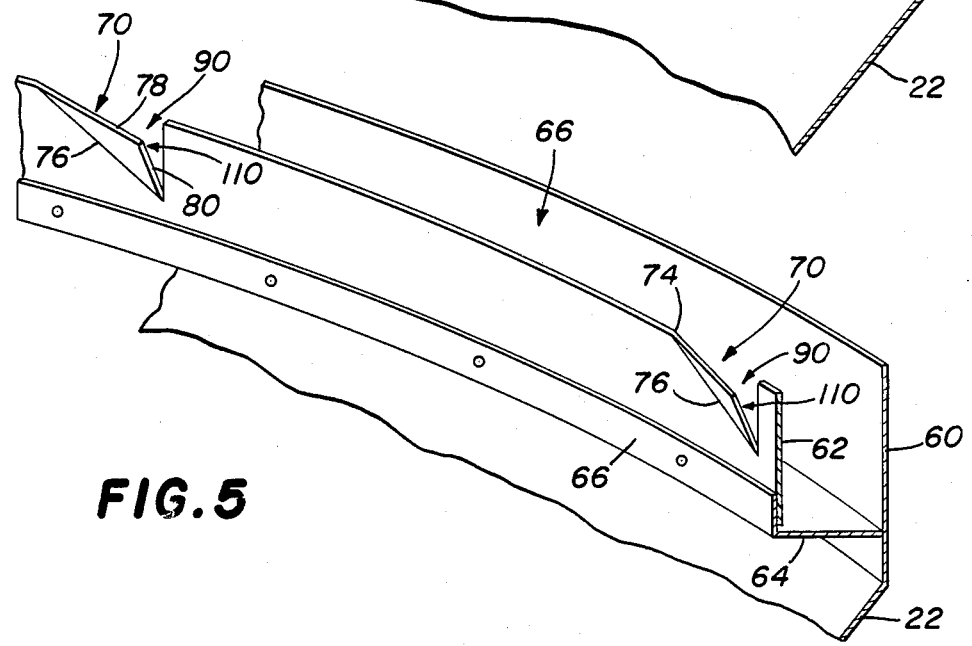
FIG. 5 is an isometric view of the top portion of the vessel shown in FIGS. 1 to 4.
Figure 6:
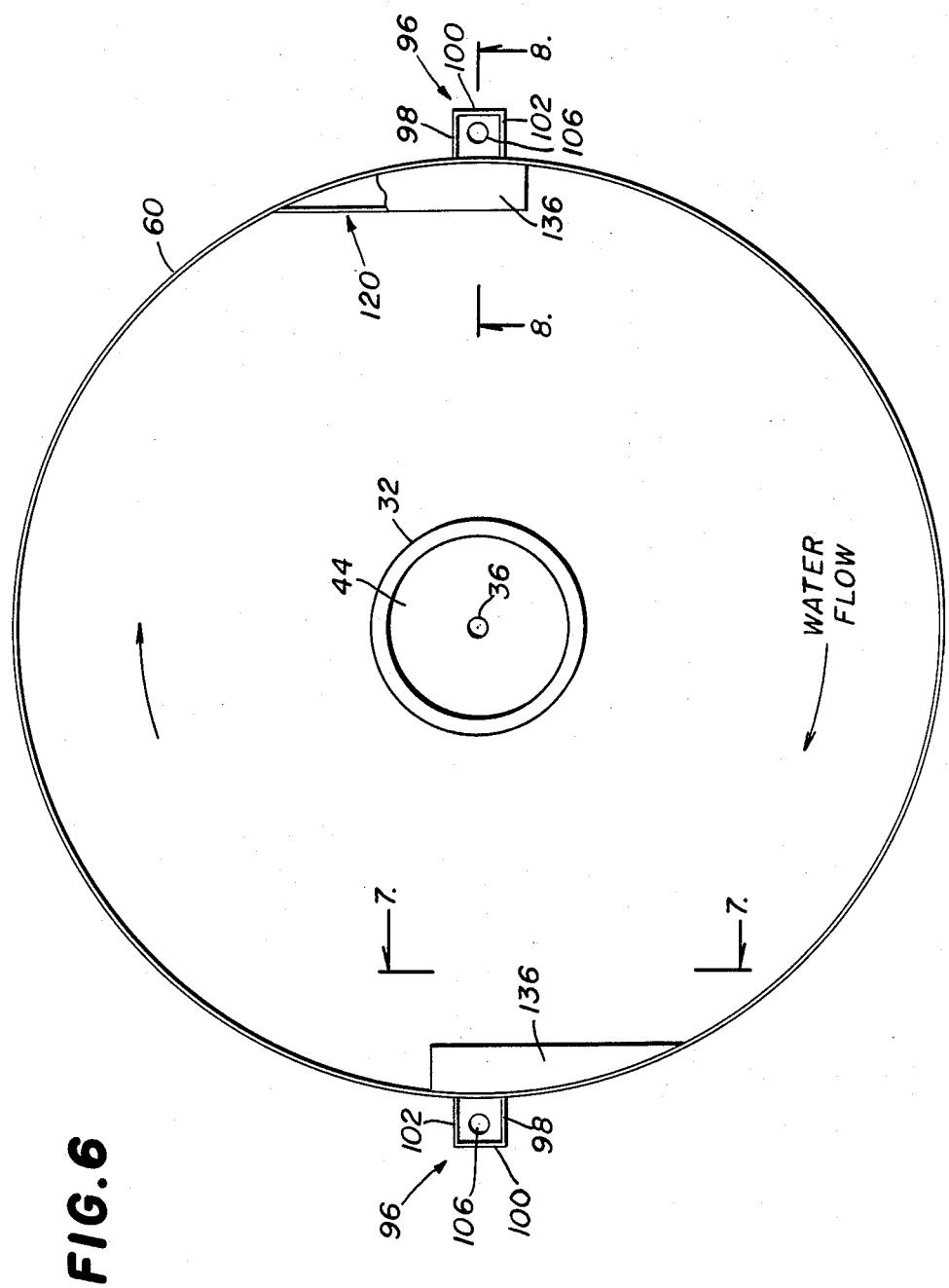
FIG. 6 is a plan view of a vessel showing a second embodiment of the invention.
Figure 7:
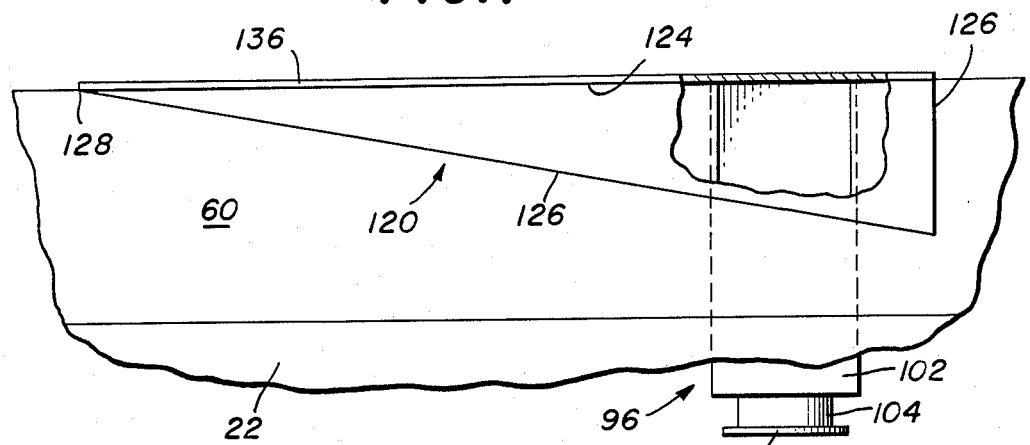
FIG. 7 is a view taken along the line 7—7 of FIG. 6.
Figure 8:
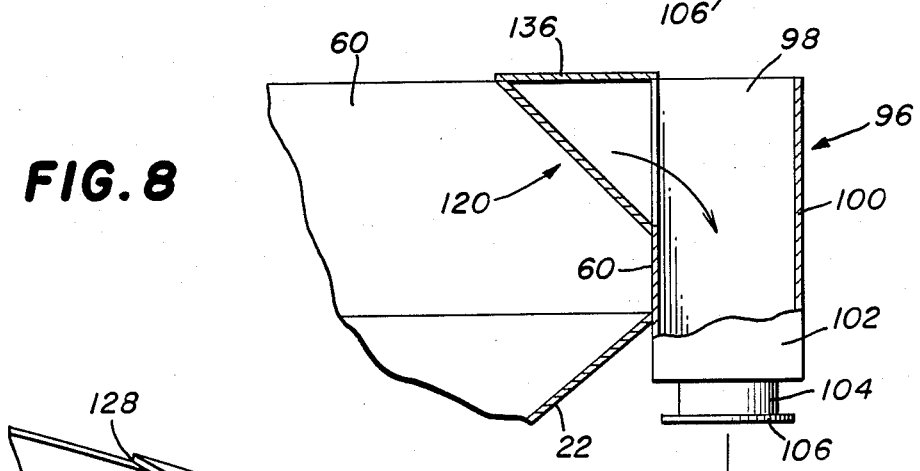
FIG. 8 is a sectional view taken along the line 8—8 of FIG. 6.
Figure 9:
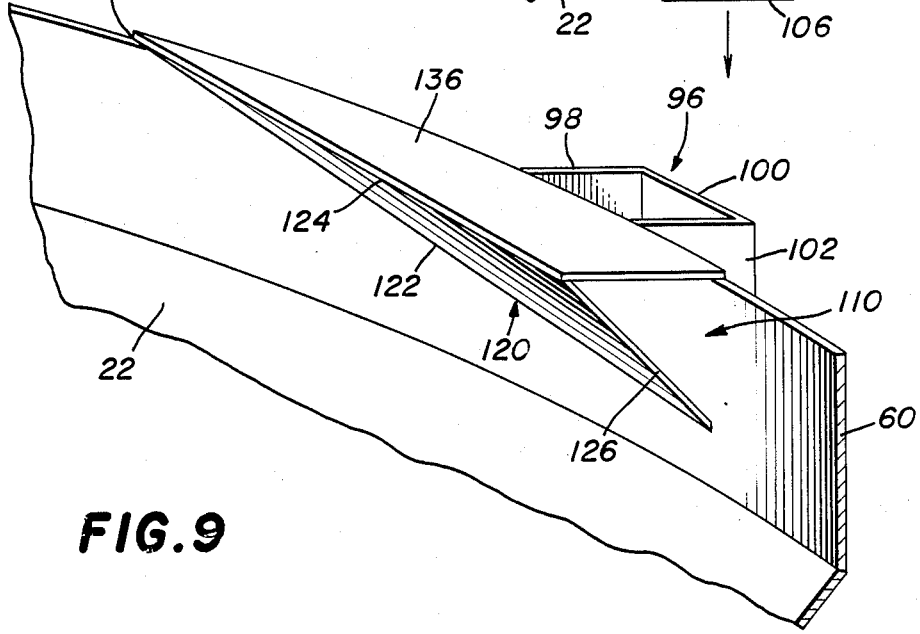
FIG. 9 is an isometric view of the top portion of a vessel and shows the second embodiment of the invention illustrated in FIGS. 6 to 8.

As shown in FIGS. 1 and 2, vessel 20 has a vertical cylindrical wall 60 extending upwardly from the top of conical portion 22. Spaced inwardly from wall 60 is a weir 62 comprising a vertical cylindrical wall. Horizontal ring plate 64 extends from vessel wall 60 to the bottom edge of weir wall 62. Ring plate 64 has a vertical flange 66 on its inner edge to which weir wall 62 can be adjustably connected. The vessel wall 60, weir wall 62 and ring plate 64 define a channel 68 into which clarified water flows.

A plurality of baffles 70 are located along the inner surface of weir wall 62 (FIGS. 1 to 5). Each baffle 70 is readily formed by making a vertical cut 72 from the top down in weir wall 62. Such a cut can be one foot long. Then a distance of two feet back from the cut a point 74 is marked upstream of the circular flow of water 50. A line 76 is then drawn from that point 74 to the bottom of cut 72. The weir wall portion is then bent along the line 76 until it has an inward and upward slope and a downward pitch of about thirty to forty-five degrees. The inward slope is about forty-five degrees. The resulting baffle 70 is triangular in shape and has long sides 76,78 of about equal length and a short side 80. By forming baffle 70 as described, clarified water overflow outlets 90 are produced in the top of weir wall 62.

A water drop box 96 is located along the outer surface of wall 60. It has vertical exterior sides 98,100,102 and an inner side wall formed largely by vessel wall 60. The bottom 104 of the drop box 96 is provided with an opening 106 for withdrawing water from the drop box. An opening 108 (FIG. 1) is provided in wall 60 so that water can flow from channel 66 into drop box 96.

As the water 50 above sludge blanket 46 flows clockwise as shown in FIG. 2 the outer peripheral flow contacts the sloped baffles 70, which can be positioned to be partially above and partially below the water level surface and even totally below the water surface. The arrangement and shape of the baffles directs solids in the water away from weir wall 62 and radially inwardly thereby forming a stream of clarified water along the weir. This stream of clarified water changes its flow direction substantially and actually reverses flow at the end of baffle 70 and enters the mouth 110 defined by the baffle end 80 and the weir wall 62. The clarified water then spills over cut out 90 into channel or trough 66 in which it flows to opening 108 in wall 60 and then to drop box 96.

Although the baffles 70 are shown to extend to the top of weir wall 62, the baffles could be positioned below the weir wall 62 top edge by making horizontal and vertical cuts and then bending the sheet down to form a triangular baffle as already described.

Although the baffle 70 could have a vertical wall with an upstream end adjoining weir wall 62 and a downstream end spaced radially inwardly from the weir wall, it is considered that better clarification is obtained by sloping the baffle inwardly as illustrated in the drawings and, in addition, to have the baffle sloped downwardly in a downstream direction. A baffle so positioned induces the solids to travel radially inwardly and downwardly away from the mouth 110.

FIGS. 6 to 9 illustrate a second embodiment of the invention in which no weir wall is used. In this embodiment one or more baffles 120 is located around the inside of vessel wall 60. Each baffle 120 is substantially triangular with two long approximately equal sides 122, 124 and a short end side 126. The apex 128 of the baffle 120 is illustrated located at the top of wall 60 and the long top side 124 is illustrated located in the same horizontal plane as the top edge of wall 60. However, the apex 128 and the long top side 124 can be located below the top of the wall 60. The short side or end 126 of the forty-five degree sloped baffle 120 together with the adjacent portion of wall 60 define a water inlet mouth 110 into which clarified water flows. Opening 130 is located in wall 60 so that clarified water entering mouth 110 can flow through the opening into drop box 96. An optional top 136 can be located over the space from the baffle top side 124 to the adjacent edge of wall 60 to help hold the baffle securely. Such a top 136 can also be used with the baffle of the first embodiment of the invention previously described herein.

The operation of this second embodiment is the same as described with respect to the first embodiment. Furthermore, although each embodiment is illustrated with a plurality of baffles, it should be understood that the invention can be employed with only one baffle and ancillary means for withdrawing clarified water. Additionally, the invention is not limited to use in a conical vessel since it can be employed in any size or shape tank where there is helical upward flow of a liquid containing suspended solids with circular flow at the liquid surface.

Although the vessels are shown with the upper end or top open, when desired a roof or other covering can be included to protect against inclement weather, for environmental purposes or to recover a volatile fluid.

EXAMPLE

Water purification studies were conducted using an eight foot diameter vessel of the type illustrated by FIG. 1 but with two different weir (62) structures. One weir structure had forty-five V-notches located on six inch centers. Each notch was 1.5" deep with a 90° notch. The second weir structure had two helical baffles according to the invention. Each baffle was formed by folding down a flap of the weir twelve inches long from the top of the weir to the bottom of a four inch cut to produce a helical baffle with a notch in back of it. The two outlets were 180° apart.

The vessel was filled with potable water, dirt was added to the water and a dose of alum and a polymer was added to coagulate and flocculate the dirt particles. The effluent from the vessel was recirculated to the vessel inlet. The vessel was operated in this manner for a number of flowrates, first with the V-notch weir and then with the helical baffle weir. The performance data are shown in the following table and in FIGS. 10 and 11.

TABLE

| Flow Rate (gpm) | Flow Per Notch (gpm) | Rise Rate (gpm/sf) | Turbidity (NTU) | Type of Weir |
| --- | --- | --- | --- | --- |
| 9.5 | 0.22 | 0.19 | 23.3 | V-Notch |
| 17.6 | 0.40 | 0.35 | 29.0 | V-Notch |
| 21.4 | 0.49 | 0.43 | 32.0 | V-Notch |

TABLE-continued

| Flow Rate (gpm) | Flow Per Notch (gpm) | Rise Rate (gpm/sf) | Turbidity (NTU) | Type of Weir |
| --- | --- | --- | --- | --- |
| 26.1 | 0.59 | 0.52 | 33.5 | V-Notch |
| 9.4 | 4.72 | 0.19 | 22.0 | Helical |
| 15.8 | 7.92 | 0.32 | 26.2 | Helical |
| 26.9 | 13.44 | 0.54 | 32.3 | Helical |

Figure 10:
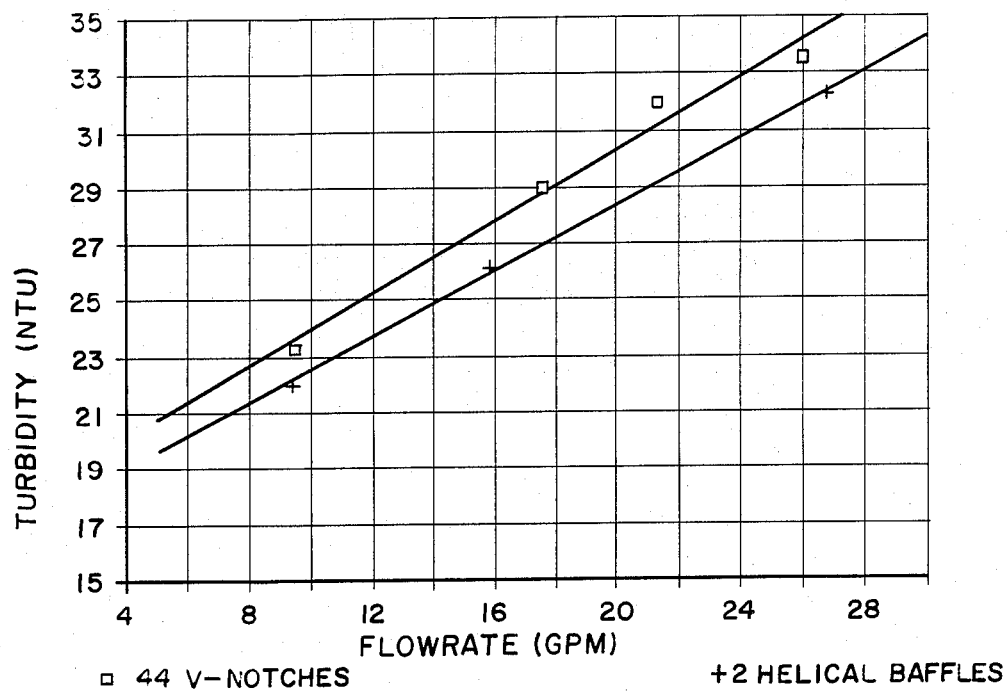
FIG. 10 is a graph plotting liquid flowrate versus effluent turbidity for two different weir structures in a vessel like that shown in FIG. 1.

FIG. 10 plots the flow rate versus the effluent turbidity. It shows a definite relationship between the flowrate and the turbidity. Also, the helical baffle weir produced slightly lower effluent turbidities than the V-notch wire at the same flowrate.

Figure 11:
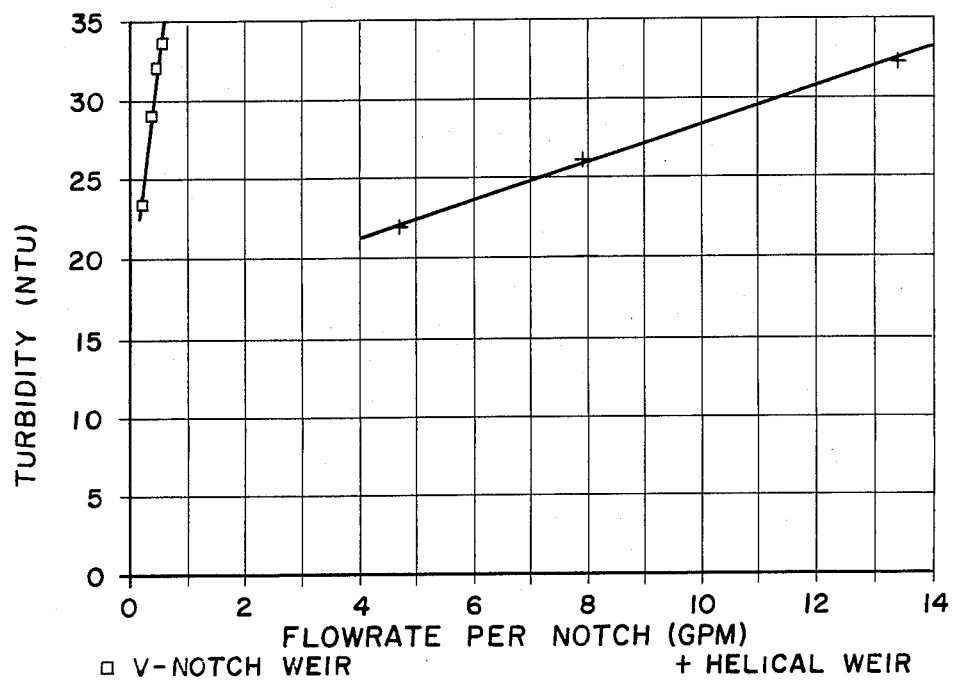
FIG. 11 is a graph plotting liquid flowrate per weir notch versus effluent turbidity for the same weir structures upon which the graph of FIG. 10 is based.

FIG. 11 shows the same data from the table in different form. It shows the data plotted as flow rate per weir notch versus the effluent turbidity. It shows that the effluent turbidity goes up as the flow rate per notch goes up. There is a substantial difference between the V-notch weir and the helical baffle weir. The helical baffle weir is able to operate at much higher flowrates per notch while producing the same effluent turbidity. It is thus possible to greatly increase the weir loading rate using a helical baffle weir without increasing the effluent turbidity.

The foregoing detailed description has been given for clearness of understanding only, and no unnecessary limitations should be understood therefrom, as modifications will be obvious to those skilled in the art.

What is claimed is:

1. Apparatus for purifying a liquid containing suspended solids which comprises:
    a walled vessel which is closed at the bottom and side and has an upper circular horizontal portion thereby defining a chamber;
    a conduit means for feeding a liquid containing suspended solids to the chamber so that the liquid flows in a helical path in the chamber the vessel upper portion;
    liquid effluent clarifying and withdrawing means, at the upper portion of the vessel, into which liquid flowing at and adjacent the liquid surface in one direction, of a circular path can substantially change direction including means for maintaining flow of the suspended solids in the circular path to a substantially greater extent than the amount of solids carried along with the liquid which changes direction sufficient for providing a stream of clarified liquid at the withdrawing means; and
    an outlet means into which the stream of clarified liquid can flow from the withdrawing means and be removed from the vessel.

2. Apparatus according to claim 1 in which the liquid effluent clarifying and withdrawing means comprises a baffle having an upstream end along the inner surface of the wall and a downstream end inwardly from the wall.

3. Apparatus according to claim 2 in which the baffle together with the adjacent vessel wall portion defines a clarified liquid receiving and withdrawing space and the outlet means communicates with the liquid receiving and withdrawing space.

4. Apparatus according to claim 3 in which the baffle includes a liquid flow directing plate having a lower edge adjoining the vessel wall and sloped downwardly and with the plate projecting upwardly and sloped inwardly of the vessel wall.

5. Apparatus according to claim 4 in which the liquid flow directing plate is substantially triangular and has two long approximately equal length side edges terminating in an upstream apex along the tank wall and a short side edge located down stream and sloped inwardly from the tank wall.

6. Apparatus according to claim 5 in which one of the triangular plate side edges is a top edge and a substantially horizontal plate extends from the liquid flow directing plate top edge to the tank wall.

7. Apparatus according to claim 1 in which a plurality of liquid effluent clarifying and withdrawing means are provided at the upper end of the vessel.

8. Apparatus according to claim 7 in which each liquid effluent clarifying and withdrawing means has its own outlet means.

9. Apparatus according to claim 1 comprising;
a substantially vertical circular weir wall spaced radially inwardly from the vessel wall and positioned near the chamber upper portion;
a horizontal ring plate extending from the vessel wall to the bottom portion of the weir wall;
the weir wall, ring plate and vessel wall defining a circular channel open at the top;
the liquid effluent clarifying and withdrawing means comprising a baffle having an upstream end along the inner surface of the weir wall and a downstream end directed inwardly from the wall.

10. Apparatus according to claim 9 in which the outlet means into which the stream of clarified liquid can flow from the withdrawing means includes an opening in the weir wall radially outward of the baffle so that the clarified liquid can flow into the channel, and means to remove the clarified liquid from the channel and conduct it outside the vessel.

11. Apparatus according to claim 10 in which the baffle has a downwardly sloped lower edge adjoining the weir wall and the plate projects upwardly and is sloped inwardly from the weir wall.

12. Apparatus according to claim 11 in which the baffle is substantially triangular and has two long approximately equal length side edges terminating in an upstream apex along the weir wall and a short side edge located downstream and sloped inwardly from the weir wall.

13. Apparatus according to claim 12 in which one of the baffle side edges is integral with the weir wall, the other side edge is substantially horizontal and the short side edge is located downstream and sloped inwardly from the tank wall.

14. Apparatus according to claim 13 in which the weir wall has a triangular outlet opening radially outward of the baffle and the triangular outlet and baffle are about the same size and shape.

* * * * *

UNITED STATES PATENT AND TRADEMARK OFFICE
CERTIFICATE OF CORRECTION

PATENT NO. : 4,765,891

DATED : August 23, 1988

INVENTOR(S) : David K. Wyness

It is certified that error appears in the above-identified patent and that said Letters Patent is hereby corrected as shown below:

Column 6, <u>line 15</u>, change "wire" to -- wier --;
<u>line 40</u>, after "chamber" insert -- in --.

Signed and Sealed this

Thirteenth Day of December, 1988

Attest:

DONALD J. QUIGG

*Attesting Officer*     *Commissioner of Patents and Trademarks*